Aug. 15, 1933.  E. V. J. TOWER  1,922,645
FRICTION CLUTCH
Filed Feb. 11, 1927  4 Sheets-Sheet 2
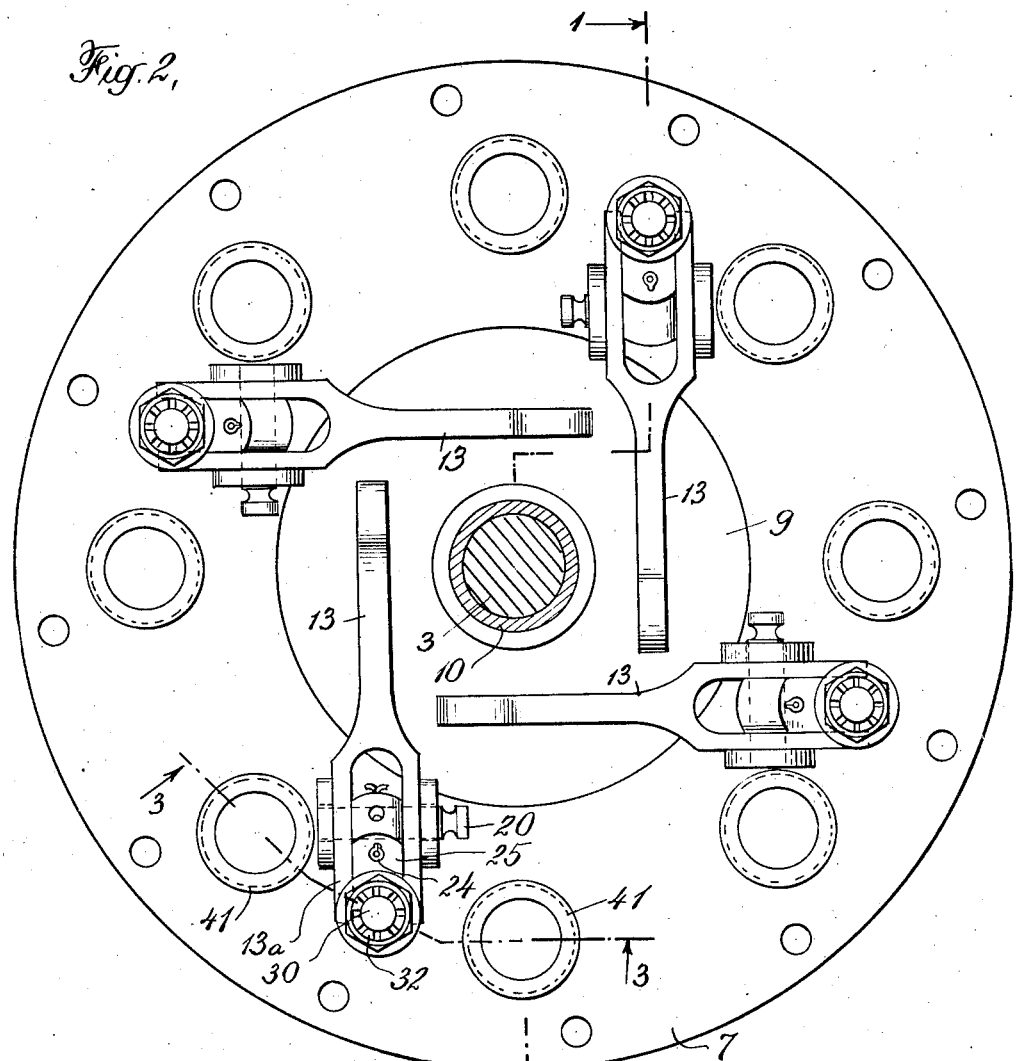
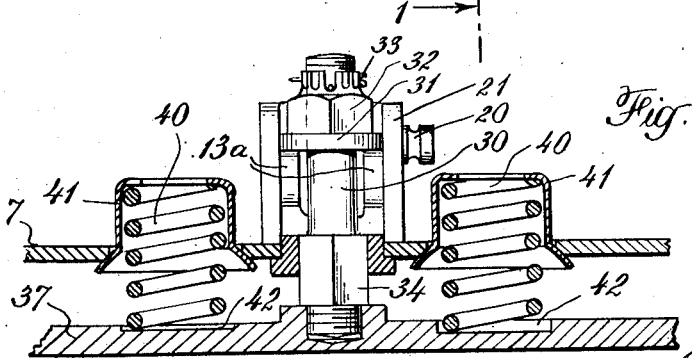
INVENTOR
BY
ATTORNEYS Aug. 15, 1933.   E. V. J. TOWER   1,922,645
FRICTION CLUTCH
Filed Feb. 11, 1927   4 Sheets-Sheet 3
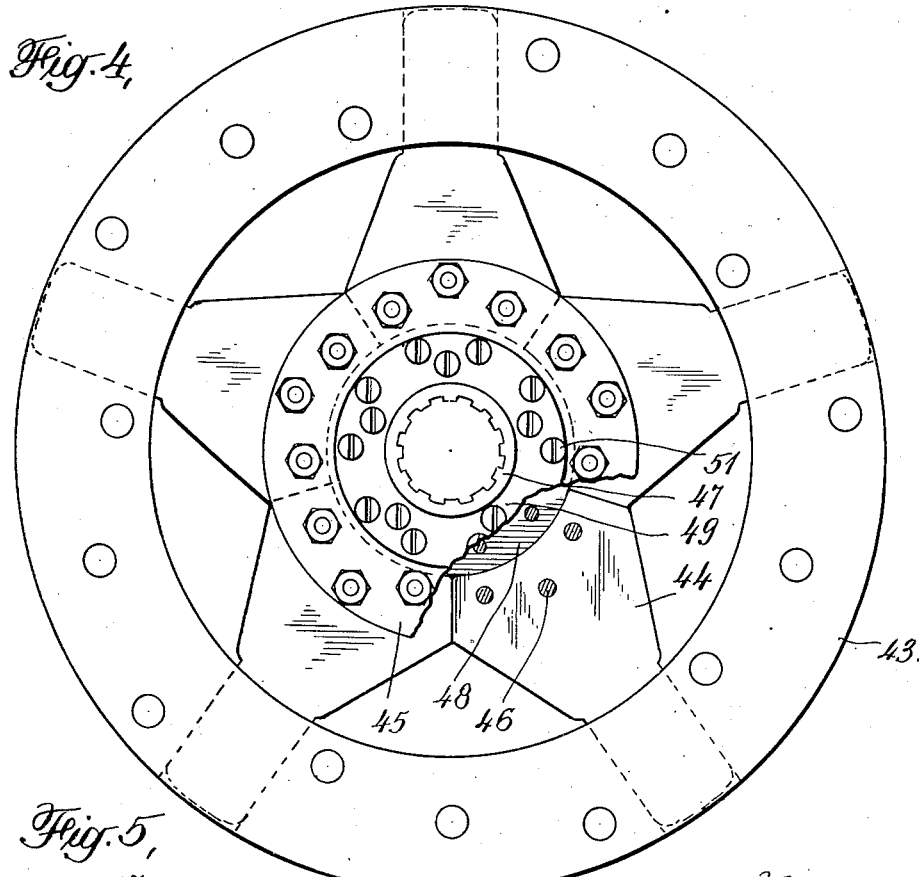
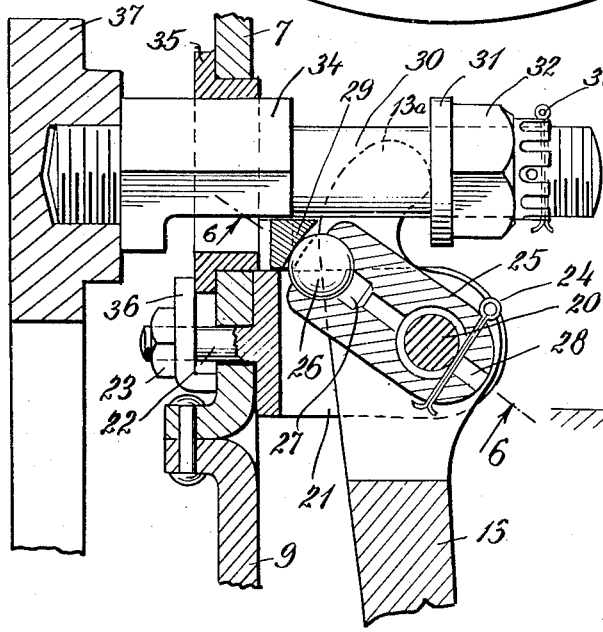
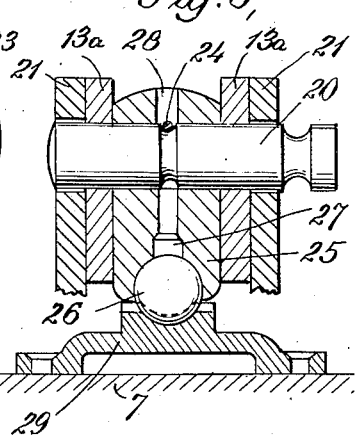
INVENTOR
Elmer V. J. Tower
BY
ATTORNEYS

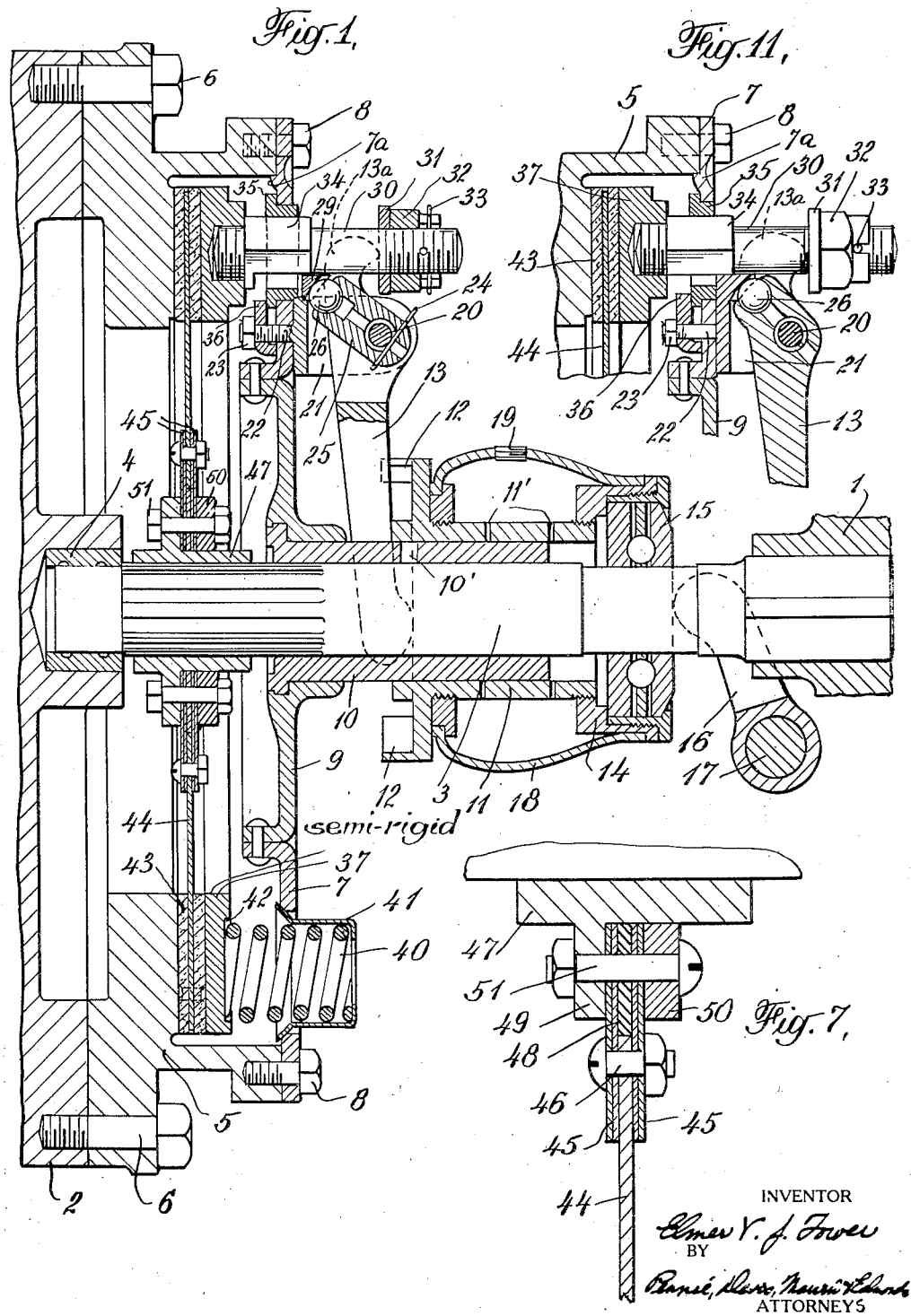

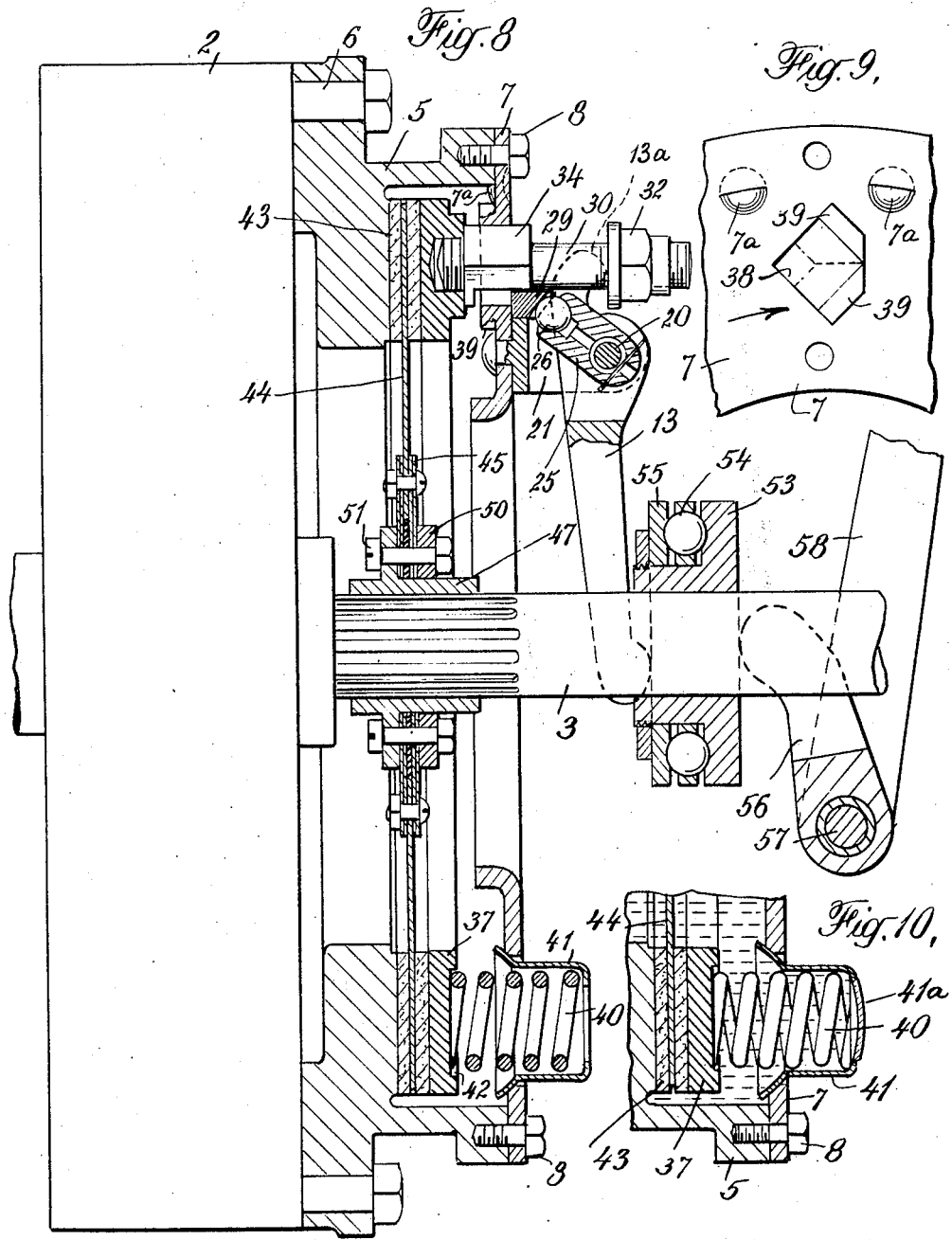

Patented Aug. 15, 1933

1,922,645

UNITED STATES PATENT OFFICE

1,922,645

FRICTION CLUTCH

Elmer V. J. Tower, North Syracuse, N. Y., assignor, by mesne assignments, to Automotive Patents Corporation, New York, N. Y., a Corporation of Delaware Application February 11, 1927. Serial No. 167,407

35 Claims. (Cl. 192—68)

This invention relates to friction clutches used to transmit power from a driver element to a driven element, and is concerned more particularly with clutches of the type employed in automobiles and other motor driven vehicles.

Automobile clutches are operated under especially severe conditions, due to the loads which they must transmit, and also to the incessant shocks and jars to which they are subjected in use. These clutches must therefore be of unusually strong and rugged construction, so that they will operate satisfactorily without slipping or seizing, and can be used for long periods without requiring repair or replacement of parts.

To secure the desired durability and positive operation, clutches as now ordinarily constructed are heavy and rigid, containing many machined parts which add greatly to the cost, and operable only by the exertion of considerable force, so that motor car driving is very tiring when frequent shifting of the speed gears is required, as in driving in traffic. In addition, the parts are usually so constructed as to require exact alignment and road shocks cause slippage in the clutch and also frequently result in distortion of the parts so that frequent adjustment and repairs are required. As these clutches are usually placed in such positions on the vehicle that access to their parts is difficult, such attention as may be required is laborious and costly.

The present invention is directed to the provision of a clutch which overcomes these several difficulties and affords many important advantages over clutches as heretofore constructed. This new clutch can be produced and installed at a low cost, has an unusually long life due to the flexibility of certain of its parts, thus avoiding wear resulting from misalignment, and while providing a positive and powerful drive, is still easy to operate.

In the new clutch, all of the elements are enclosed in a self-contained unit which may be introduced into the power transmission system without great labor and without requiring special skill. The clutching or engaging parts through which the load is transmitted are flexible or semi-flexible so as to compensate for manufacturing differences between co-acting parts, whereby great accuracy is not required and the cost of manufacturing is greatly decreased. This flexible construction absorbs vibration and shocks to a considerable extent, and the light weight of the operating parts likewise obviates the shocks which occur in present clutches as the inertia and momentum of their large masses are brought into and out of action. By a novel operating lever mechanism, the force required to release the clutch is automatically increased as the parts are moved further out of engagement so that the new clutch is easily operated and puts no tiring strains on the operator. This effect is added to by a novel spring arrangement, whereby the springs holding the parts in engagement are successively brought into action as the clutch is thrown in, so that ease and smoothness of operation are attained as well as the elimination of the sudden shock of engagement and disengagement of the friction elements. As the springs are more and more compressed in releasing the clutch, an increasing operating force would ordinarily be employed, but in the new clutch, the operating levers are so constructed that the force applied to them to release the clutch becomes of increased effectiveness as the levers perform their releasing action. The change in effectiveness of the levers, automatically secured, acts to counterbalance or offset the increased force exerted by the springs, thus reducing the force required to be exerted by the operator in effecting a complete release as compared to that required in a clutch of standard construction.

The springs acting to hold the parts engaged, are arranged to be self-centering, and the tension of each spring may be varied by a connection which permits exact adjustment of the clutch pressure. The springs are disposed between certain parts of the driving member which are relatively movable, one of the parts engaging the driven member to effect the driving connection, and the springs are so arranged that the spring load is distributed with substantial uniformity so that distortion of the clutch elements is reduced and by the avoidance of strains resulting from this construction, the clutch is made more durable.

The clutch embodies many other features of novelty including a friction plate of improved form and construction and a new type of presser plate and mounting, which will be described in greater detail in the description to follow. The new clutch is capable of use with either the unit type of transmission or the amidships type and forms of the clutch suitable for both uses are illustrated in the accompanying drawings which show different views of a preferred embodiment of the invention.

In these drawings:

Figure 1 is an assembly of the amidships type of the clutch shown in longitudinal section taken along the line 1—1 of Fig. 2;

Fig. 2 is a face view of the clutch showing the construction of the master plate.

Fig. 3 is a section through portions of the master and presser plates taken along line 3—3 of Fig. 2;

Fig. 4 is a face view of the friction ring and spider;

Fig. 5 is an enlarged section of a portion of the master and presser plates, showing the construction of the clutch release levers;

Fig. 6 is a section taken along the line 6—6 of Fig. 5, showing the fulcrum arrangement of the clutch release levers;

Fig. 7 is an enlarged section of the friction spider illustrating the flexible construction;

Fig. 8 is an assembly of the unit type of clutch shown in longitudinal section;

Fig. 9 is a plan view illustrating one method of forming the master ring;

Fig. 10 is a sectional view illustrating an arrangement whereby the clutch may be run in oil; and Fig. 11 is a sectional view showing a modified form of release lever construction.

Referring to the drawings, Fig. 1 shows the clutch adapted for use with the amidships type of power transmission in which the clutch and the transmission gears, of which a portion of one of the gears is shown at 1, are adjacently arranged at the fly-wheel 2 and connected by a short shaft 3, the forward end of which is journalled in a bushing 4 mounted in fly-wheel 2. The friction drum 5 of the clutch may be mounted on the face of the flywheel in any convenient way as by a number of tap bolts 6, or may be cast integral therewith. This drum is provided with a rim to which the master plate 7 is attached by a number of tap screws 8.

The master plate 7 is preferably formed of thin metal in the shape of a ring, which is properly centered upon friction drum 5 by means of a row of projections 7a near its periphery. These projections are deformations of the metal caused by a blunt instrument, and are subsequently partly cut away to fit into the inside of friction drum 5. In this manner, master plate 7 may be accurately centered without cutting away metal at the edges to form a piloting flange as is usually done, and this expensive machining operation is thereby eliminated.

In the amidships type of power transmission, the master plate 7 is fitted with a hub 9 which supports a bushing 10 forming a bearing for shaft 3, while in the unit type of power transmission, this hub and bushing are omitted, as shown in Fig. 8, since an additional bearing for the propeller shaft is provided between the clutch and the transmission gears.

Slidably mounted upon bushing 10 is the clutch release collar, which comprises a sleeve 11 having projections 12 at its inner end which form grooves for the reception of the ends of release levers 13, while the outer end of sleeve 11 is provided with a housing 14 adapted to contain the ball thrust bearing 15. The clutch release yoke 16, which is mounted upon pin 17 secured to a convenient part of the vehicle is operated in the usual manner by the clutch pedal, not shown. A bulging cylindrical member 18 is fitted over this release collar so as to form an oil reservoir which is supplied through an oil hole normally closed by threaded plug 19. Sleeve 11 is provided with oil holes 11' which lubricate the surface of bushing 10 and also communicate with similar oil holes 10' in bushing 10 when the collar is advanced to be in the release position, so that shaft 3 is also lubricated. By this arrangement the oil is conserved and kept clean and fluid, since it is protected from dirt and against evaporation.

Clutch release levers 13, of which four are shown, are each loosely mounted on a pin 20 which is in turn loosely journalled in a forked yoke 21 attached to the face of master plate 7 by an integral threaded stud 22 provided with a nut 23. Pin 20 is fixed in place by a cotter key 24 passing through pivot block 25 journaled on the pin and lying between the arms of yoke 21, the key engaging an annular groove in pin 20 and thereby holding the pin against axial displacement while permitting it to rotate, as is most clearly shown in enlarged Figs. 5 and 6. This last mounting of levers 13 in yokes 21 provides a limited lost motion or floating support for the levers, which allows them to move bodily in their mountings as the balls 26 travel up or down the race-ways 29. This arrangement permits of ready assembling, requires fewer parts and less accurate and therefore more economical machine work, as a loose-fitting pin may be used. The free end of pivot block 25 is provided with a spherical seat in which a hardened steel ball 26 is mounted and held in position by spinning over the edges of the spherical seat to form the ball socket. The three-point contact formed by ball 26 and the two journals of pin 20 in the arms of yoke 21 is self-centering since pin 20 is loose in its bearing, and thus manufacturing differences between parts are compensated for. An oil reservoir 27 is provided in pivot block 25 behind the ball 26, and is supplied from an oil hole 28 in the head of the pivot block. Inasmuch as the angular movement of ball 26 is small, only sufficient oil is carried out of reservoir 27 by the movement of the ball to lubricate the latter in its spherical seat. The air-tightness of ball 26 in its seat causes the air pressure in the oil hole 28 to keep the oil from flowing out of reservoir 27 through oil hole 28, no matter what the relative position of release lever 13 may be. By this arrangement the oil will last a long time and is protected against dust and evaporation.

The race-way plate 29 for ball 26 is mounted upon and secured to master plate 7, as is shown in Figs. 5 and 6 and is preferably of hardened steel. By this arrangement race-way plate 29 may be removed when worn and replaced by a new plate, or as is shown in Fig. 11, the ball raceway may be made integral with release lever yoke 21. The outer end of release lever 13 is forked to form the short lever arm 13a, and spans stud 30 so as to engage washer 31 under castellated nut 32 upon the outer end of stud 30. Stud 30 and nut 32 are provided with a small pitch thread so that a fine adjustment between them is possible. In order to lock them together in these fine adjustments, two holes at right angles are provided in stud 30 for cotter key 33. The importance of this arrangement will be explained later.

Stud 30 secured to the presser plate of the clutch is provided with a squared portion 34 which is cut away at the inner side so as to provide clearance for raceway 29, and this squared portion is slidably mounted in a bushing 35 which is secured in place in an aperture in master plate 7 by means of a clip 36 under nut 23 on stud 22 of yoke 21. Stud 30 is tapped into a boss provided on presser plate 37, and drives the latter when the clutch is engaged. Studs 30 are arranged upon presser plate 37 so that a diagonal of each is radially placed with respect to the centers of the master and presser plates. By means of this V-block arrangement, all of the studs 30 are self-centering in their respective bushings 35, and the pressure is distributed over the two flat surfaces of the squared portion 34 which face the direction of rotation of the clutch. It is evident that any wear of square portions 34 and of bushings 35 will be reduced to a minimum, and what wear there is will be uniform on both pressure surfaces of each. In the construction shown in Fig. 9, bushing 35 is eliminated by extruding the metal during the formation of squared holes 38, so as to provide a double thickness of the metal upon the two pressure sides 39 of the square hole 38, as the other two opposite sides do not take any of the driving pressure.

As shown particularly in Figs. 1, 2 and 3, a number of pressure springs 40 are disposed between master plate 7 and presser plate 37. One of these springs 40 is arranged at each side of driving stud 30, and spaced the same distance from the center of shaft 3 as stud 30, so that all of the operating connections between master plate 7 and presser plate 37 are on the same circle, which prevents distortion and strains between these plates and thereby insures the full clutching effect. These springs 40 are placed in open end cups 41 which are provided with a projecting flange of spherical section engaging a spherical seat in master plate 7. The openings in master plate 7 are made larger than the diameter of spring cups 41 so that there may be a movement between them to permit the springs therein to be self-centering. By providing depressions 42 in presser plate 37, the springs 40 are also piloted at both ends. As shown in Fig. 3, these depressions 42 are alternately deep and shallow so that part of the springs 40 come into action before the remainder, in order to prevent the shock of sudden action, and also to permit of a regulation of the degree of slipping of the clutch, which may be desirable in operation. This variation in depth of the depressions is of greatest utility when employed in connection with a flexible or semiflexible presser plate. A difference of one-sixteenth of an inch between depressions 42 is equal to approximately fifty pounds difference in spring pressure in a typical clutch. Thus, by varying the depressions 42, the clutch action may be controlled in a simple manner. As it is practically impossible to obtain springs of exactly the same tension in quantity production, the inherent variation between different springs also aids in the even gradation of the spring pressure when the clutch is engaged. The open outer ends of spring cups 41 permit the circulation of air into the interior of the clutch whereby it is kept cool. If it is desired to run the clutch in oil or other liquid, liquid-tight caps 41a are sprung into the openings of spring cups 41, as is shown in Fig. 10, thereby entirely enclosing the clutch friction and presser plates.

The presser plate 37 may be of somewhat lighter construction than is commonly used in presser plates in clutches as now made and preferably it is semi-rigid so that it will yield to some extent under the pressure of springs 40 and preferably sufficiently to insure uniform contact of the clutch friction members, thereby compensating for any slight inequalities in the clutching surfaces which would otherwise impair the efficiency of the clutch. The simple construction of the presser plate 37 presents an economical use of metal and requires machine work only on the operating face and bosses for studs 30.

The friction plate arranged between presser plate 37 and the operating surface of friction drum 5, comprises the ring 43 formed of any suitable friction material mounted upon spokes 44 of sheet metal which are light and flexible. The hub ends of the spokes are formed so as to make a complete circle when they are assembled, and thereby each spoke supports and is supported by the next adjacent spokes. The hub ends of these spokes 44 are clamped between flexible washers 45 by means of bolts 46 or rivets. Between the hub ends of the spokes and the hub 47 and also clamped between washers 45, is placed a heat insulating washer 48 of asbestos fibre or the like. A flange 49 is provided upon hub 47 between which and a separate ring 50 is clamped this assembly of washers 45 and insulating washer 48 by means of bolts 51 or rivets. The hub 47 is splined upon shaft 3 in the manner shown in Fig. 1. By this arrangement, hub 47 may be made light and thin, the necessary strength being supplied by flange 49 and ring 50, while the arrangement of flexible washers 45 and insulating washer 48 provides one point of flexibility, and the arrangement of flexible washers 45 and spokes 44 provides another point of flexibility, while further flexibility is secured due to the light construction of the spokes. Spokes 44 are interchangeable and are shaped so that they may be reversely cut from a sheet of stock without waste. This flexible spider connection between the rigidly mounted hub 47 and the friction ring 43 also compensates for irregularities between the friction surfaces of the clutch by bending slightly where necessary consistent with the corresponding semi-rigidity of presser plate 37, which has been explained.

The ring 48 being of heat insulating material protects the hub against heat developed at the friction surface and transmitted through the spokes. It also serves to centralize the spokes with reference to the hub, simplifying assembling operations.

It will be noted that the spokes are of increasing width as the hub end is approached and this arrangement provides greater heat radiating surface. In addition, at the hub end each spoke is braced against the adjacent spoke and in firm contact with ring 48, so that a strong construction is obtained and strains are transmitted evenly. The openings between adjacent spokes permit air circulation which assists in the dissipation of the heat, and as the spokes are flexible, and flexibly mounted on the hub, vibration is absorbed, the clutch operates smoothly and noise is largely eliminated.

Fig. 8 illustrates the form of clutch construction applicable to the unit type of power transmission, in which the long shaft 3 is provided with a separate rear bearing, not shown. In this form of construction, the hub 9 and bushing 10 shown in Fig. 1 are omitted and the clutch runs open. The release collar comprises a sleeve 53 slidably mounted on shaft 3 and provided with a ball thrust bearing 54 having a bearing plate 55 against which the ends of release levers 13 bear. The clutch release fork 56 engages the rear surface of sleeve 53, and is mounted upon shaft 57 so as to be movable by lever 58 connected to the clutch pedal.

In operation, the release collar is advanced to the left, as seen in Figs. 1 and 8, by release yokes 16 or 56, respectively upon operation of the clutch pedal. This movement applied to release levers 13 causes them to pivot about pins 20, and likewise causes balls 26 to move up race-ways 29 toward studs 30 as the tips of the short arms 13a of levers 13 press against washers 31 of studs 30, thereby causing relative movement between master plate 7 and presser plate 37 against the tension of springs 40. The arrangement of springs 40 causes a gradual release of presser plate 37 from the friction disc so as to cause slipping between friction disc 43 and the corresponding surface of friction drum 5 before entire disengagement of the clutch is effected. As ball 26 moves up race-way 29, it is apparent that the length of lever arm 13 about ball 26 as the fulcrum is increased, while the length of lever arm 13a is decreased. Accordingly, an increasingly greater force is produced by the release lever as it is moved to disengage the clutch, and therefore the force required to secure a complete clutch release is much less than is usually required. For example, in order to produce slipping of the clutch, approximately thirteen and one-half pounds may be required, and approximately twenty-five pounds for a complete release, whereas in a present standard clutch, the complete release requires approximately three times as much force for complete release as is required to produce a slip. Instead of requiring more force to compress the springs as their load increases, the automatically lengthening lever arm absorbs this increasing spring load by partially counterbalancing it, so that the increased pedal pressure required is not such as to make the operation difficult. This arrangement, therefore, takes less force to operate the clutch, and provides for smoother operation since the increase in force necessary is not so great as has been heretofore necessary.

The rate of increase in the length of the long arm of lever 13 may be increased by moving the location of pivot pin 20 nearer the plane of the lever which passes through the fulcrum at ball 26 and the end of the lever 13 engaged by the sleeve 11 of the release collar. This is shown in Fig. 11, which also illustrates the manner of making the pivot block 25 of Figs. 5 and 6 integral with lever 13. Instead of altering the relation of pivot pin 20 and fulcrum ball 26, the short arm 13a of the lever may be made longer along the axis of stud 30, which will produce the same effect, namely that of increasing the rate of change in the length of the lever arms.

The adjustment of the clutch may be effected by changing the relation between nuts 32 and studs 30, which adjustment is a micrometer adjustment, as the screw threads of nut 32 and stud 30 are preferably of small pitch, so that a partial turn of nut 32 between the cotter pin holes in stud 30 will move nut 32 only a slight amount relatively to the stud 30.

It will be seen that the new clutch affords many important advantages over clutches as heretofore constructed. The new clutch is easier to operate by reason of the provision of the novel lever mechanism and the new method of mounting the springs, and it is much cheaper to manufacture, install and maintain. The flexibility of the engaging parts and the improved contact between them resulting from such flexibility reduces wear, eliminates jar and vibration and adds to the life of the clutch because permanent distortion is prevented. At the same time, strains on the mechanism due to slippage are prevented, and there is less likelihood of breakage of parts. Also, less exact machining of the parts is required, thus reducing the cost.

As the clutch has the form of a self-contained unit, it may be readily installed, and the manner in which the parts are assembled permits ready access to such parts as may require occasional adjustment. All the parts are of simple construction and may be made strong and durable, although the weight of the complete clutch is considerably less than that of a clutch of present standard construction adapted for the same duty.

The new friction disc assembly is of low manufacturing cost and light in weight and yet it has strength sufficient to stand the strains and loads to which it is subjected in use. The use of a disc made up of a relatively light hub and light sheet metal spokes carrying the friction disc secures the maximum flexibility at very low cost, all of the parts used being capable of quantity production at a high output rate. These parts can be assembled into a unit by labor not highly skilled as no fine adjustments of the parts are required. Due to the unusual flexibility afforded by the new disc, much vibration is eliminated and permanent distortion which so frequently occurs in ordinary clutches, requiring replacement of parts, is virtually eliminated.

With the new operating lever arrangement, the change in the position of the fulcrum during lever operation makes it possible to secure maximum motion of the presser plate and minimum leverage on disengagement of the clutch thus providing for a short time element. In the engaging operation the levers provide a miximum leverage and minimum motion of the presser plate, so that a long time element is involved. The clutch can therefore be quickly disengaged in emergencies, while the engagement may be done slowly and smoothly. By proper selection of spring pressures and construction of levers, the clutch can be made to operate at very low pedal pressures even though minimum leverage is used, and this makes clutch operation easy and not tiring on the driver. Owing to the firm engagement of the driving and driven members due to the flexibility of the parts, I have found in practice that only a relatively light spring pressure is required to secure an engagement which will not slip when used in the ordinary motor car even though the engine is greatly overloaded by braking.

The new clutch consequently provides service much in excess of that secured from present standard clutches, as well as much greater comfort and safety for the occupants of the vehicle, and these advantages are accompanied by a low cost both to the car manufacturer and the user.

I claim:

1. A friction clutch comprising the combination of a driving element, a driven element, and means for causing engagement and disengagement of the driving and driven elements, said means including a movable part driven by the driving element for frictionally engaging the driven element, a lever, a relatively fixed pivot between the ends of said lever mounting the same on the driving element, a fulcrum for said lever between the ends thereof and movable about said pivot and engaging said driving element, and connections between one end of said lever and said movable part for moving the latter as the lever is operated.

2. In a friction clutch, the combination of a driving element, a driven element, and means for causing engagement and disengagement of the driving and driven elements, said means including a lever, a relatively fixed pivot between the ends of said lever mounting the same upon said driving element, a fulcrum between the ends of said lever and movable about said pivot and engaging said driving element, a movable part driven by said driving element for frictionally engaging said driven element, a stud on said movable part, and a connection between one end of said lever and said stud whereby said part is moved upon movement of said lever.

3. In a friction clutch, the combination of a driving element, a driven element, said elements being normally engaged, and means for causing engagement and disengagement of said elements including a presser plate, and a simple lever pivoted between its ends and connected at one end to said plate, said lever having arms automatically varying in length as the lever is operated.

4. In a friction clutch, the combination of normally engaged driving and driven elements, and means on the driving element for engaging and disengaging the elements, said means including a plurality of substantially straight levers, each having a pivot and a fulcrum between its ends, said fulcrum being movable about said pivot to vary the length of the lever arms as the lever is manipulated.

5. In a friction clutch, the combination of normally engaged driving and driven elements, and means on the driving element for engaging and disengaging the elements, said means including a lever provided with means for varying the lengths of the lever arms and having a limited lengthwise movement.

6. In a friction clutch, the combination of a driving element, a driven element, resilient means normally holding said elements in engagement, and mechanism for releasing said means, including a simple lever fulcrumed between its ends and also adapted to swing about a pivot between its ends, the fulcrum point being movable about said pivot to automatically vary the effectiveness of the lever throughout its range of movement.

7. In a friction clutch, the combination of a driving element, a driven element, a plurality of springs operable to hold the elements in engagement, and a self-centering mounting for each spring in one of the elements, one end of each spring being received in the said mounting.

8. In a friction clutch, the combination of a driving element, a driven element, a plurality of springs operable to hold the elements in engagement, and a mounting for each spring in one of the elements, the said mounting being non-rigid and laterally movable.

9. In a friction clutch, the combination of a driving element, a driven element, a plurality of springs operable to hold the elements in engagement, and a self-centering mounting for each spring in one of the elements including a cup in which the end of the spring is received, this cup having a limited pivotal movement in the element.

10. In a friction clutch, the combination of a driving element, a driven element, a presser plate connected to one of said elements, springs mounted on one of said elements for effecting the engagement of the driving and driven elements, and substantially straight levers for disengaging the elements, each of said levers having a movable fulcrum between its ends for automatically varying the lengths of its lever arms to compensate for the variations in spring pressure during operation of the clutch.

11. In a friction clutch, the combination of a driving element, a driven element, a presser plate connected to said driving element, a plurality of single springs mounted on said driving element for effecting the engagement of the presser plate with the driven element, said springs being alternately of different lengths so as to successively come into action, and levers for effecting the disengagement of the presser plate and the driven member.

12. A friction clutch comprising the combination of a driving element, a driven element, a pressure member connected to said driving element, springs acting on the member to cause it to force the elements into engagement, said springs being adapted to successively come into action, and levers for releasing the elements, said levers having automatically varying lever arms to compensate for the varying spring pressure during operation of the clutch.

13. In a friction clutch, the combination of a driving element, a driven element, a presser plate for connecting the elements, and mechanism on the driving element for moving the presser plate to disconnect the elements, said mechanism including levers having lost motion supports and automatically variable lever arms.

14. A friction clutch comprising the combination of a driving element and a driven element rotatable about a common axis, means carried by one of the elements for effecting their engagement and disengagement, and means for actuating the means first mentioned comprising a plurality of levers, each having a pivot between its ends, and a fulcrum between its ends movable about said pivot to automatically vary the length of the arms of the lever throughout its range of action.

15. In a friction clutch, the combination of a presser plate and a master plate, springs between the presser plate and master plate tending to separate the said plates, and a lever carried by the master plate operable to move the plates together, the said lever having a fulcrum movable about a floating pivot to vary the length of the lever arms as the lever is actuated.

16. In a clutch, the combination of a driving element, a presser plate attached thereto, and a lever carried by the driving element for moving the presser plate with reference thereto, the said lever including a ball acting as a fulcrum and movable over a curved surface arranged to vary the length of the lever arms as the lever is operated.

17. In a clutch, a master plate, a presser plate mounted thereon, and means for causing the movement of the presser plate relative to the master plate, including a lever having a ball seated in the end of a socket in the lever and serving as a fulcrum, and a fulcrum surface over which the ball moves in the operation of the lever the said surface being formed to vary the lengths of the arms of the lever.

18. In a clutch, the combination of a master plate and a presser plate, springs between the plates tending to separate them, a stud attached to one plate and extending through the other, means on one of the plates co-acting with the stud to cause a movement of the plates against the action of the springs, the said means including a yoke mounted upon one of said plates, a lever pivoted in the yoke and connected to the other plate, and a variable fulcrum for the lever engaging said one plate.

19. In a clutch, the combination of a master plate, a presser plate, a stud attached to the presser plate and extending through the master plate, a pivotally mounted lever on the master plate engaging the projecting end of the stud, a yoke in which the lever is mounted, a fulcrum projection on the lever, and a fulcrum surface adjacent thereto over which the projection is movable during the operation of the lever.

20. In a clutch, the combination of a master plate and a presser plate, a stud secured to the presser plate and extending through an opening in the master plate the metal of the master plate being extruded and folded back upon itself at the opening to provide a bearing surface for the stud at one side of the opening.

21. An operating device for use in a clutch for effecting release of the driving and driven elements thereof, comprising a lever, a yoke in which the lever is mounted, a socket in the lever forming a receptacle for lubricant, a ball closing one end of the socket and serving as a fulcrum for the lever, and a surface over which the ball moves as the lever is operated.

22. A friction clutch comprising driving and driven elements, a member made of deformable material adapted to be mounted on one of said elements, said member having means for facilitating its mounting consisting of a plurality of deformed portions of the member partly cut away to engage cooperating portions of the other element.

23. An operating device for use in a clutch for effecting release of the driving and driven elements thereof, comprising a yoke, a pin loosely mounted in the legs of the yoke, this pin having a circumferential channel, a lever loosely mounted on the pin, and a pin mounted in the lever and entering the channel in the first pin to prevent its displacement from the yoke.

24. A friction clutch comprising the combination of a driving element, a driven element, and means for causing movement of one element relative to the other to effect their engagement and disengagement, said means comprising a plurality of levers, each having a limited bodily movement and a variable fulcrum, the said levers being arranged to provide a maximum leverage and minimum movement at the beginning of the engaging operation, and a minimum leverage and maximum movement at the beginning of the disengaging operation.

25. In a friction clutch the combination of a two-part element, the parts of which are relatively movable, and a lever on one of said parts operable to move the other part relative thereto, the said lever being pivotally mounted between its ends and having a fulcrum adjacent the mounting between the ends of the lever, one end of the lever being movable to effect its operation and the other end being connected to the movable part of the element.

26. In a friction clutch, the combination of a driven element, a driving element, and means for causing the engagement and dis-engagement of the driven and driving elements, said means including a lever having a movable fulcrum and a movable axis, between its ends, said axis being mounted on one of said elements and the fulcrum being movable thereon, a movable part on said one element frictionally engaging the other element, and connections between one end of said lever and said movable part, whereby movement of the lever causes the fulcrum to move about its pivot to disconnect said movable part from said other element, the movement of the axis being in accordance with the movement of the fulcrum.

27. In a friction clutch, the combination of a driven element, a driving element, and means for causing the engagement and dis-engagement of the driven and driving elements, said means including a lever having a movable fulcrum and a movable axis, said fulcrum and axis engaging one of said elements, and connections between said lever and the other element, the movement of the fulcrum being greater than the movement of the axis.

28. In a friction clutch, the combination of a driving element, a driven element, a presser plate connected to one of said elements, said presser plate having spring-receiving recesses of varying depths, and substantially like coil springs seated in the recesses and engaging said one element.

29. In a friction clutch, the combination of a driving element, a driven element, a presser plate connected to one of said elements, said presser plate having alternately deep and shallow spring-receiving recesses, and substantially like coil springs seated in the recesses and engaging said one element.

30. In a friction clutch, the combination of a driving element, a driven element, a presser plate connected to one of said elements, spring seats in said presser plate, spring seats on said one element registering with the presser plate seats, the spacing between the corresponding seats varying, and substantially like springs between the registering spring seats.

31. In a friction clutch, the combination of a driving element, a driven element, a presser plate connected to one of said elements, a set of spring seats on said presser plate, a set of spring seats on said one element registering with the presser plate spring seats, the seats of one of said sets being of varying depths, and substantially like springs between the registering spring seats.

32. In a friction clutch, the combination of a driving element, a driven element, a master plate on said driving element, a presser plate adapted to engage and drive said driven element, a driving stud projecting from said presser plate through said master plate and serving as the sole driving connection between said master and presser plates, a lever operatively connected at one end to said stud, and a fulcrum for said lever engaging said master plate, said fulcrum being adjustable to vary the action of said lever and including a ball.

33. In a friction clutch, the combination of a driving alement, a driven element, a master plate on said driving element, a presser plate adapted to engage and drive said driven element, a driving stud projecting from said presser plate through said master plate and serving as the sole driving connection between said master and presser plates, a lever operatively connected at one end to said stud, and a fulcrum between the ends of said lever engaging said master plate and including a ball.

34. In a friction clutch, the combination of a driving element, a driven element, a master plate on said driving element, a presser plate adapted to engage and drive said driven element, a driving stud projecting from said presser plate through said master plate and serving as the sole driving connection between said master and presser plates, a lever connected at one end to said stud, and a fulcrum between the ends of the lever, said fulcrum including a member on the master plate and a ball engaging said member.

35. In a friction clutch, the combination of a two-part rotary driving element, and a member mounted on one of the parts and engaging the other part and having two intersecting plane surfaces forming a V-block directed in the direction of rotation of the element, said surfaces constituting the sole working faces of the member in contact with the said other part during rotation of the clutch.

ELMER V. J. TOWER.